United States Patent [19]

Koganezawa et al.

[11] Patent Number: 5,698,157
[45] Date of Patent: Dec. 16, 1997

[54] METHOD OF MAKING A WINDOW PANEL WITH A RESIN FRAME

[75] Inventors: Koji Koganezawa; Noriyuki Yoshihara; Tsuyoshi Onishi, all of Yokohama, Japan

[73] Assignee: Asahi Glass Company Ltd., Tokyo, Japan

[21] Appl. No.: 614,250

[22] Filed: Mar. 12, 1996

[30] Foreign Application Priority Data

Mar. 13, 1995 [JP] Japan .................... 7-052680

[51] Int. Cl.⁶ .................. B29C 47/02; B29C 47/16; B29C 47/88
[52] U.S. Cl. ............... 264/500; 264/177.16; 264/177.17; 264/177.19; 264/252
[58] Field of Search ............... 264/177.16, 177.17, 264/177.19, 211.12, 500, 252, 237, 210.5

[56] References Cited

U.S. PATENT DOCUMENTS

| | | | |
|---|---|---|---|
| 3,239,402 | 3/1966 | Ecklund et al. | 264/500 |
| 3,780,152 | 12/1973 | Friesner | 264/177.16 |
| 4,576,773 | 3/1986 | Azzola et al. | 264/177.16 |
| 5,057,265 | 10/1991 | Kunert et al. | 264/296 |
| 5,162,090 | 11/1992 | Arima | 264/177.16 |
| 5,240,664 | 8/1993 | Hayashi et al. | 264/177.17 |
| 5,362,428 | 11/1994 | Tsujino et al. | 264/252 |
| 5,376,319 | 12/1994 | Arima | 264/177.19 |
| 5,458,824 | 10/1995 | Powers et al. | 264/177.19 |
| 5,489,409 | 2/1996 | Koganezawa et al. | 264/252 |
| 5,571,461 | 11/1996 | Scholl et al. | 264/177.16 |

FOREIGN PATENT DOCUMENTS

| | | | |
|---|---|---|---|
| 47-13541 | 4/1972 | Japan | 264/500 |
| 1-204713 | 8/1989 | Japan | 264/177.16 |
| 6-71723 | 3/1994 | Japan . | |

*Primary Examiner*—Robert Davis
*Attorney, Agent, or Firm*—Sughrue, Mion, Zinn, Macpeak & Seas, PLLC

[57] ABSTRACT

Synthetic resin is extruded through a die on a window panel along its peripheral portion to form a resin frame having a specific shape; air is blown to a lip portion extending from the resin frame toward the outer peripheral side of the window panel to maintain or change the shape of the resin frame, and the resin frame is solidified to connect integrally with the window panel.

20 Claims, 8 Drawing Sheets

Movement of plate material

METHOD OF MAKING A WINDOW PANEL WITH A RESIN FRAME

BACKGROUND OF THE INVENTION

1. Field of the Invention

The present invention relates to a method of making a window panel with a synthetic resin frame suitable for a window glass for a vehicle or a window glass for construction.

2. Discussion of Background

In a window glass for a vehicle or for construction, a resin frame of stripe form, a gasket or the like made of synthetic resin is provided, in order to increase an ornamental effect or sealing properties, in a clearance between a plate material for a window which is formed of a glass plate or a plastic plate and an opening portion to which the plate material for a window is fixed.

Conventionally, in fixing of this resin frame, a post-fixing method is conducted, as described, for instance, in Japanese Unexamined Patent Publication No. 158479/1982 and Japanese Unexamined Patent Publication No. 158480/1982, wherein a resin frame previously formed by an injection method or an extrusion method is bonded to a peripheral portion of a plate material for a window, or the plate material is fitted to a window opening followed by fitting the resin frame produced by an extrusion method in the clearance. However, in these methods, automatic manufacturing is difficult since considerable steps require manual operations, and these methods increase manufacturing cost because of the large number of manufacturing steps.

In the conventional post-fixing method, a moisture hardening type urethane series sealant or a dual liquid reaction hardening type urethane series sealant is used for bonding the plate material for a window to the resin frame because they have a high bonding strength to glass and excellent durability. The sealant is injected in a groove which constitutes a bonding surface between the resin frame and the plate material for a window. However, it is difficult to form the sealant uniformly and thinly because it is a highly viscous sol-like material. When the resin frame is press-contacted to a surface of the plate material for a window, an excessive amount of the adhesive is squeezed out from an end of the bonding surface. As a result, it is indispensable to remove the squeezed-out portion of the adhesive by manual operations. Or an uneven surface results in the surface of the resin frame due to an uneven thickness of the applied adhesive, this providing a poor appearance.

Further, the time needed for curing the adhesive is as long as from several hours to a full day. Accordingly, a number of jigs for pressing are required after the synthetic resin frame has been fixed to the plate material for a window, or much equipment and spaces for preserving plate materials until the adhesive agent is cured are required, whereby much manufacturing cost is needed.

In order to solve the above-mentioned problems, a so-called encapsulation method is proposed, as exemplified in Japanese Unexamined Patent Publication Nos. 58481/1982 and 73681/1983, wherein a synthetic resin frame is formed integrally with a peripheral portion of a plate material for a window by injecting synthetic resin or raw material thereof into a cavity space in a mold in which the plate material for a window is disposed.

In the encapsulation method, the plate material for a window is put in a rigid mold made of metal or the like, and synthetic resin or raw material thereof is injected into a cavity space provided by the peripheral portion of the plate material for a window and the inner surface of the mold. The encapsulation method has advantages of reducing labor in the molding, and providing a high dimensional accuracy of the product. However, it has a serious problem that when a glass plate is used as the plate material for a window, the glass plate is apt to break at the time of clamping the mold because there is a curved portion in the glass plate and lack of dimensional accuracy. In order to prevent the glass plate from breaking at the time of clamping of the mold, an elastic material is disposed at the contact surface of the mold to the glass plate, or the mold is so contrived as to push the glass plate with a spring or the like under constant pressure. However, these measures do not solve the problem of the breaking of the plate material for a window.

In U.S. Pat. No. 5057265, there is proposed a method of extruding synthetic resin material from a die along a peripheral portion of a glass plate into a predetermined shape to form a shaped body of resin frame at the peripheral portion of the glass plate, and curing the shaped body of resin frame to thereby connect the resin frame integrally with the glass plate.

In the proposed method, however, when a hardening resin material of low viscosity is used to form a shaped body having good appearance, the shape of a portion in an extension which extends beyond the edge portion of the glass plate cannot be maintained and is apt to deform. When a resin material of high viscosity is used to improve the shape-maintaining property, the outer appearance of a shaped product is deteriorated. Further, an excessive load is applied to the extruder for extruding the synthetic resin material.

Japanese Unexamined Patent Publication No. 71723/1994 proposes a method that a relative movement is caused between a panel and a die along a peripheral portion of the panel, and a resin material is extruded to thereby form a resin frame integrally with the panel. However, the proposed method has a problem as follows. When a thermoplastic resin having a high impact resistance and a low friction coefficient is used as synthetic resin material for a glass plate for automobile and if the viscosity of the resin is reduced to improve the outer appearance of the product shaped, the shape of a portion in an extension of the product extending beyond the edge portion of the glass plate cannot be maintained and is deformed. On the contrary, when the viscosity of the resin is increased to improve the shape-maintaining property of the product, the outer appearance of the shaped product is inferior.

FIG. 2 shows a shaped body of resin frame 4 in cross section. When the plate material is a glass plate for automobile, there is often required that the wall thickness of the shaped body of resin frame 4 is uneven in consideration of matching of the resin frame to an automobile body and aerodynamic characteristics. In particular, the wall thickness of the shaped body is thin at a portion 6 which contacts the automobile body. In this case, the shape of the shaped body may be changed before solidification can occur (as shown in FIG. 3) whereby a predetermined shape cannot be obtained.

SUMMARY OF THE INVENTION

It is an object of the present invention to eliminate the above-mentioned disadvantages in the conventional techniques, and to provide a novel method of making a window panel with a resin frame.

According to the present invention, there is provided a method of making a window panel with a resin frame comprising:

forming a shaped body of resin frame by extruding synthetic resin through a die into a specific shape along the peripheral portion of a plate material to be used as a window on at least one surface of the plate material;

blowing gas to at least a part of the shaped body of resin frame so that the shape of the shaped body is maintained or changed, and solidifying the shaped body to firmly connect the same to the plate material.

In accordance with the present invention, there is provided a method of making a window panel with a resin frame comprising:

forming a shaped body of resin frame by extruding synthetic resin through a die into a specific shape along the peripheral portion of a plate material to be used as a window on at least one surface of the plate material;

applying a correction tool to at least a part of the shaped body of resin frame so that the shape of the shaped body is maintained or changed, and solidifying the shaped body to firmly connect the same to the plate material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
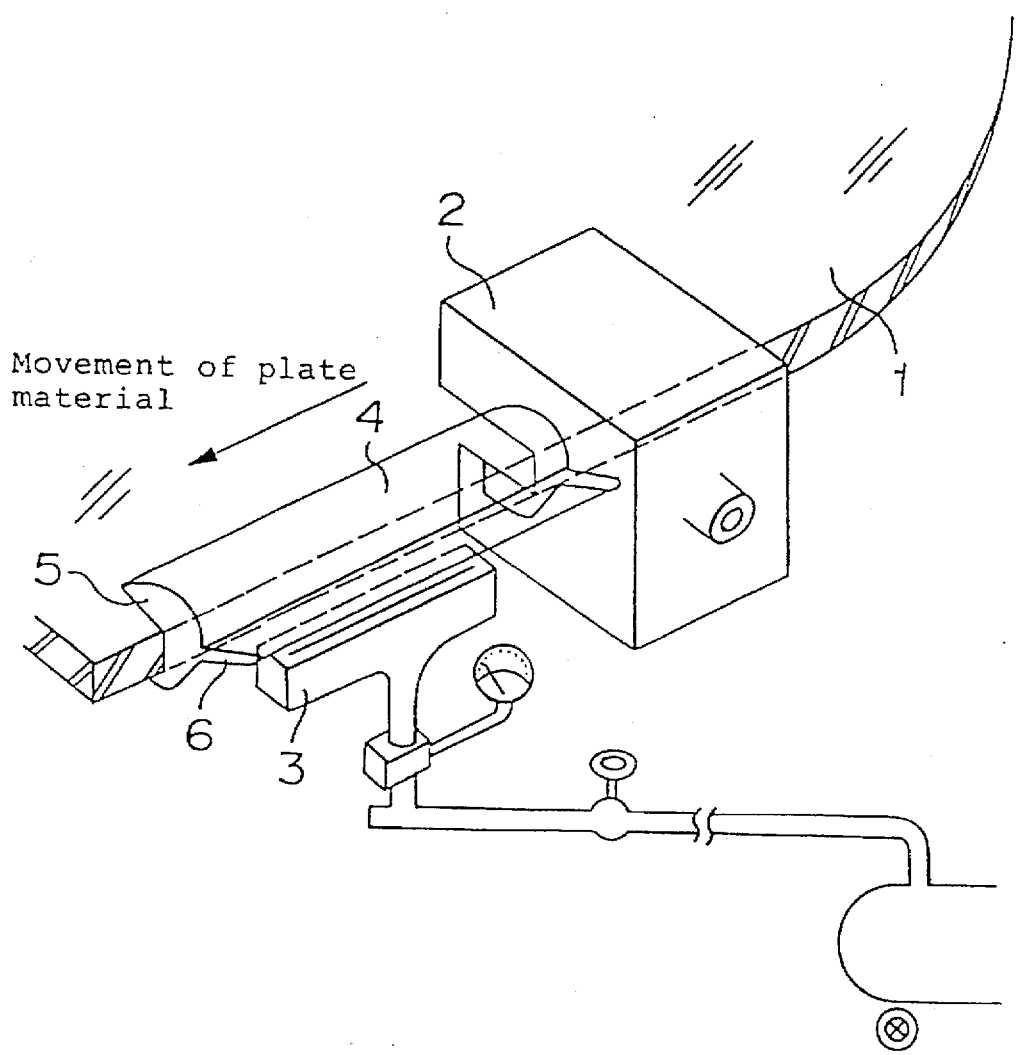
FIG. 1 is a diagram showing an embodiment of the method of making a window panel with a resin frame according to the present invention.

Now, the present invention will be explained in more detail with reference to the drawings. FIG. 1 is a diagram showing an embodiment of the method of making a window panel with a resin frame according to the present invention. A plate material 1 is inserted into a die 2 from its rear portion and is moved inside the die at a certain speed. During the movement, a synthetic resin material is extruded from an outlet formed at the front surface portion of the die 2 which has a shape corresponding to the shape in cross section of a shaped body of resin frame 4 extruded, and the extruded shaped body 4 is formed at a peripheral portion of the plate material 1. Then, the shaped body of resin frame is solidified whereby the plate material with which the resin frame is integrally formed is obtainable. In this embodiment, thermoplastic resin is used as a synthetic resin material. So, the thermoplastic resin is in a molten state by heat at the time of extruding for shaping and is solidified by heat dissipation.

Figure 2:
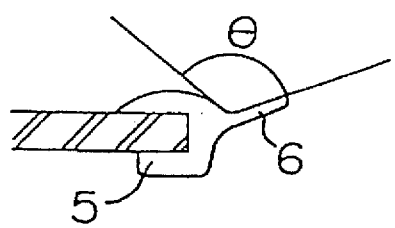
FIG. 2 is a diagram in cross section showing an embodiment of the shape of a resin frame.
Figure 3:
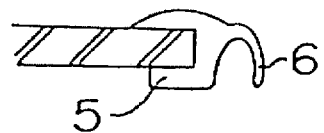
FIG. 3 is a diagram in cross section showing a change of the shape of the resin frame.

A nozzle 3 for blowing compressed air is provided near the outlet formed at the front surface portion of the die 2. The nozzle 3 is to blow compressed air at a certain pressure for a predetermined time to a lower portion of a thin-walled lip portion 6, which is brought to contact with an automobile body, the lip portion projecting to the side of the outer periphery of the plate material 1 beyond the edge of the plate material, when the shaped body 4 which has just been extruded to the peripheral portion of the plate material 1. The compressed air from the nozzle 3 prevents the sagging of the lip portion 6 due to the gravity, as shown in FIG. 3, and prevents the solidification of the shaped body of resin frame with deformation. In this case, when the temperature of the compressed air is made lower than the temperature of the shaped body of resin frame which has just been extruded, the shaped body can be positively cooled so that the solidification of the shaped body is accelerated. Further, by suitably adjusting the pressure of compressed air to the lip portion, the blowing time and the distance for blowing, the installation angle θ of the lip portion 6 (FIG. 2) can be controlled as desired.

In the embodiment as shown in FIG. 1, the nozzle 3 is disposed at a lower position of the lip portion 6 and about 10 mm apart from the same so that compressed air of the 3 kg/cm$^2$ is blown to the lip portion 6. When it is necessary to blow gas to a local portion of the lip portion as in this embodiment, it is preferable that the nozzle is located in a range of about 10 mm to about 20 mm from the local portion. When the position of the nozzle is determined, the magnitude of the pressure of compressed air to be blown is determined.

In the above-mentioned embodiment, the pressure of 3 kg/cm$^2$ to be blown is specifically described. However, air is blown at a pressure of 2–4 kg/cm$^2$ in the arrangement of the nozzle as described above. On the contrary, since the range of the pressure of air to be blown is generally in a range of 0.5–10 kg/cm$^2$ in consideration of the performance of a nozzle, a compressor and so on, the position of the nozzle is determined corresponding to the performance.

Figure 4:
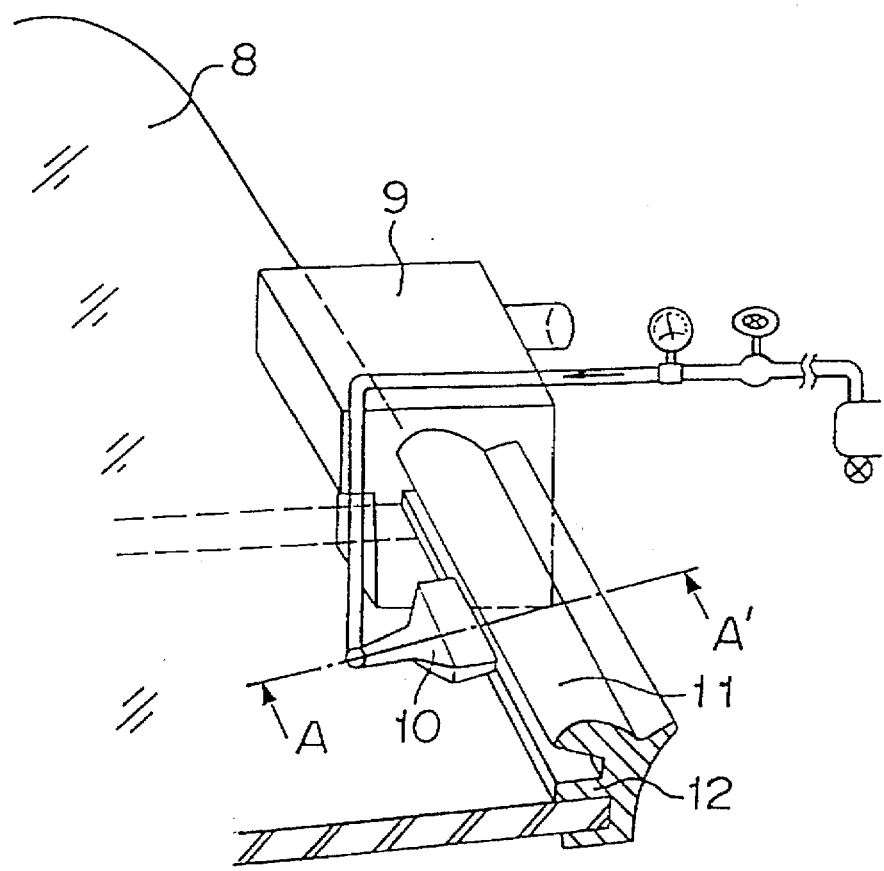
FIG. 4 is a diagram showing another embodiment of the method of making a window panel with a resin frame according to the present invention.

FIG. 4 is a diagram showing another embodiment of the method of making a window panel with a resin frame according to the present invention. In this embodiment, a shaped body 11 with a rain gutter 12 is formed integrally with a peripheral portion of a glass plate for automobile 8 as the plate material. The rain gutter 12 is often required to have a large surface area in cross section in order to increase a water discharging efficiency. Accordingly, there is a case that the shape of the rain gutter 12 after it has just been formed on the plate material can not be maintained and is solidified in a deformed shape as shown in the cross-sectional view of FIG. 5B.

Figure 5:
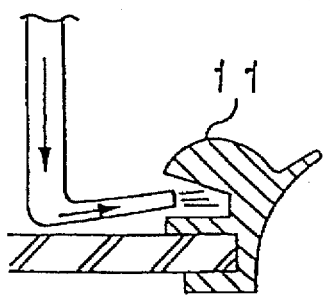
FIGS. 5A and 5B show a diagram in cross section showing a change of the shape of the resin frame.
Figure 5:
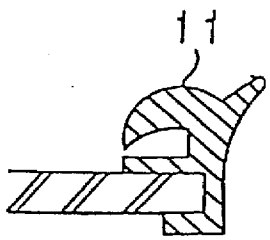

In the embodiment shown in FIG. 4, a nozzle 10 is disposed near an outlet formed at the front surface portion of a die 9 so that compressed air of 1 kg/cm$^2$ is blown to the rain gutter 12 of the shaped body 11 for 2 seconds just after the formation of the shaped body 11, whereby the shape of the rain gutter 12 can be maintained into a predetermined shape as shown in the cross-sectional view of FIG. 5A. In this case, "2 seconds" means the time during which each portion of the shaped body 11 is applied with the compressed air, and it does not mean the time as a part of the step for unifying the resin frame to the plate material.

Figure 6:
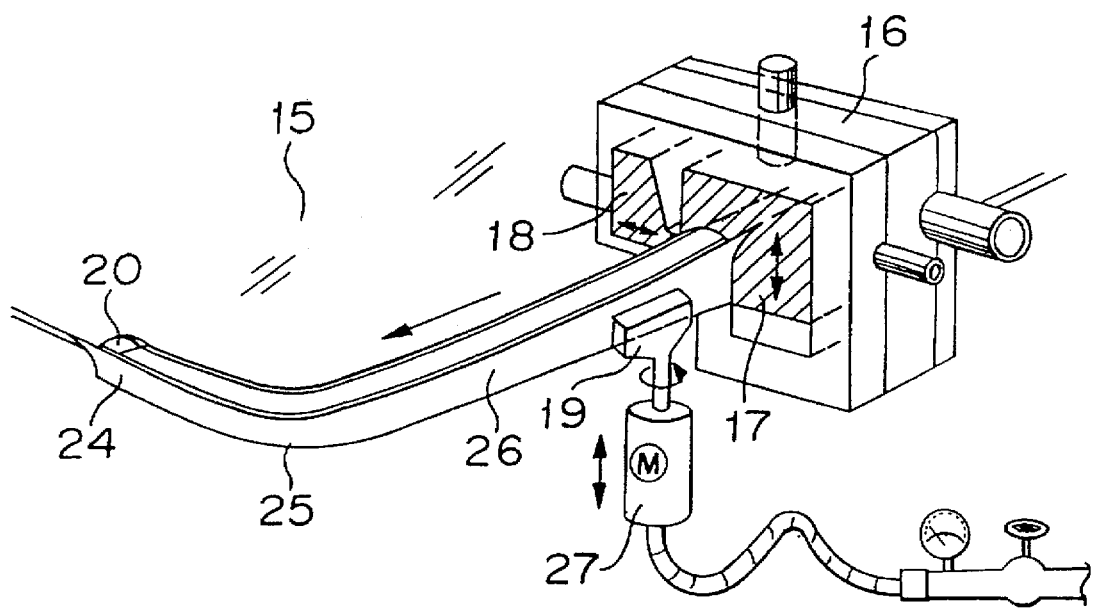
FIG. 6 is a diagram showing another embodiment of the method of making a window panel with a resin frame according to the present invention.

FIG. 6 is a diagram showing a case that a shaped body whose cross-sectional surface area is gradually changed is formed integrally with a peripheral portion of a glass plate for automobile 15 as the plate material. In this embodiment, chlorinated polyethylene (having a Shore hardness A of 60) having a high impact resistance and a low friction coefficient is used for lip portion 22 which contacts with an automobile body and flexible polyvinyl chloride (having a Shore hardness A of 93) is used for a base portion 21.

Figures 7A, 7B:
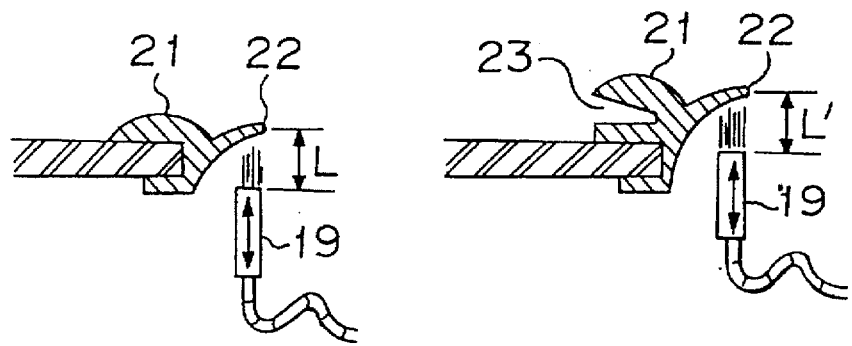
FIG. 7A is a schematic view in cross section of a shaped body of resin frame which is formed at an upper side portion of the plate material in FIG. 6.
FIG. 7B is a schematic view in cross section of a shaped body of resin frame which is formed at a side portion of the plate material in FIG. 6.

Generally, a frame to be attached to a window for automobile has a flush-surface shape wherein the thickness of the frame is small at an upper side portion 24 as shown in FIG. 7A, and has a shape in cross section wherein the thickness of the base portion which includes the rain gutter is large at a side portion 26 as shown in FIG. 7B. They are smoothly connected together at a corner portion 25.

In this embodiment, core members 17 and 18 are disposed in a die 16. They are moved at predetermined timings by means of a driving source (not shown) to change the shape of the opening at the outlet of the die 16 whereby the shape of the frame in cross section is changed when it is extruded. At the same time, an amount of synthetic resin material to be extruded is controlled in correspondence to the shape of the opening.

In this case, the viscosity of the chlorinated polyethylene used for the lip portion 22 is reduced to obtain good outer appearance. Accordingly, when the chlorinate polyethylene is extruded along with the flexible polyvinyl chloride for the base portion 21 at the same temperature thoroughly the die, it is difficult to maintain the shape of the lip portion 22 after it has been just extruded onto the glass plate for automobile 15, and tends to be deformed downwardly. In order to prevent such undesired phenomenon, compressed air of 0.5 kg/cm$^2$ and 20° C. is blown through a nozzle 19 to the lip portion 22 for 2 seconds in this embodiment. In this case, the nozzle 19 is moved vertically by means of a driving source 27 to maintain a constant distance L (L in FIG. 7(B)) between the nozzle 19 and the lip portion 22 even when the shape of the frame in cross section changes. Thus, the shape of the lip portion 22 can be maintained accurately.

Figure 8A:
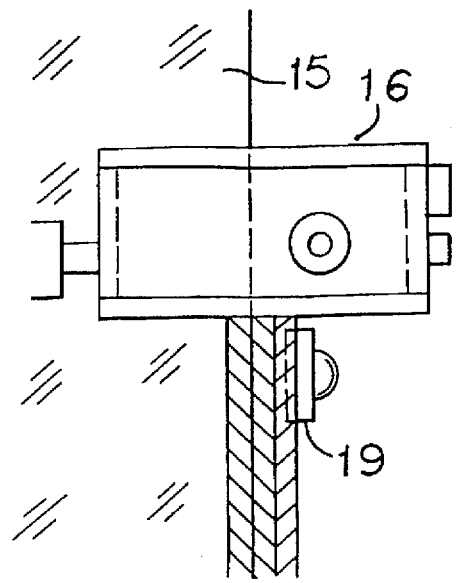
FIG. 8A is a schematic view partly cross-sectioned of a shaped body of resin frame formed at a linear portion of the plate material in FIG. 6.
Figure 8B:
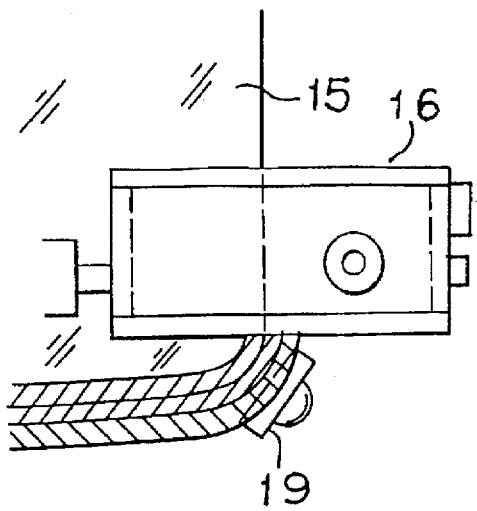
FIG. 8B is a schematic view partly cross-sectioned of the shaped body of resin frame formed at a corner portion of the plate material.

FIG. 8A is a diagram showing an upper surface of the shaped body when a frame is formed at a linear portion of the glass plate of automobile. The die 16 and the nozzle 19 are located in a substantially parallel relation. On the other hand, when the frame is formed at a corner portion 25 of the glass plate for automobile 15, the nozzle 19 is turned by a predetermined angle by means of the driving source 27 so that compressed air is blown to the lip portion for a predetermined time (FIG. 8B). As a result, the frame whose cross-sectional shape is gradually changed with accurate dimensions is formed throughout the entire peripheral portion of the glass plate for automobile 15.

Figure 9:
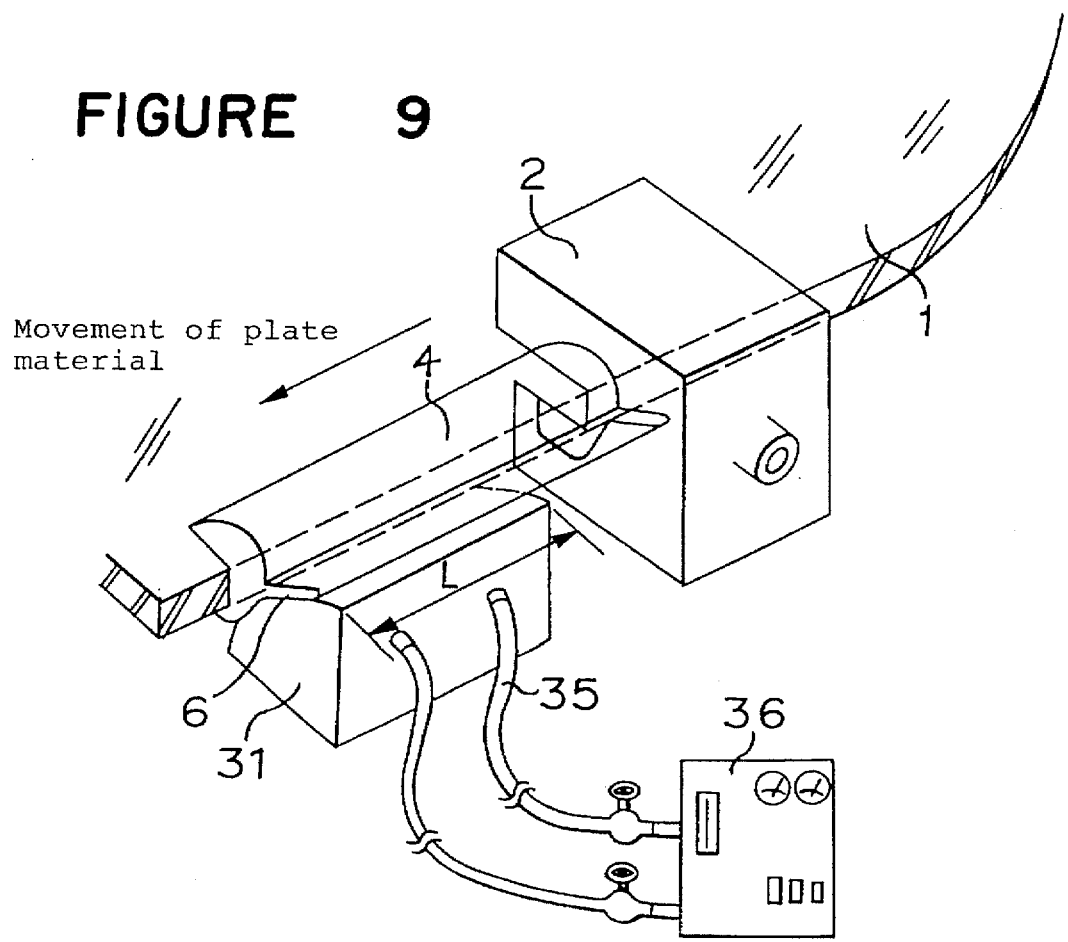
FIG. 9 is a diagram showing an embodiment of the method of making a window panel with a resin frame according to the present invention.

FIG. 9 is diagram showing a method of making a window panel similar to FIG. 1 except that a correction tool 31 is used instead of the nozzle for blowing compressed air. The correction tool 31 is disposed near the outlet formed at the front surface portion of the die 2. A cooling pipe 35 is connected to the correction tool 31 so that water whose temperature is controlled by means of a water temperature controlling device 36 is circulated in the cooling pipe 35 whereby the surface temperature of the correction tool 31 can be constantly maintained. The correction tool 31 is applied to the thin-walled portion 6 of the shaped body 4, which contacts with the automobile body, from the lower portion of the shaped body 4 just after the shaped body is formed. Thus, the correction tool 31 supports the thin-walled portion 6 which tends to deform downwardly due to the gravity, whereby the correction tool 31 prevents the solidification of the shaped body with deformation. The installation angle θ of the thin-walled portion 6 can be controlled as desired by suitably adjusting the effective lengths L and the surface temperature of the correction tool 31 (FIG. 2).

Figure 10:
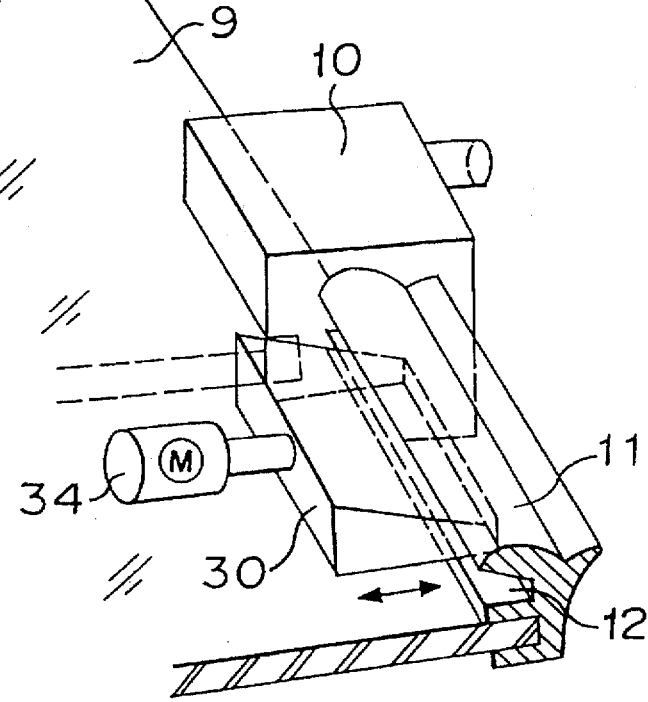
FIG. 10 is a diagram showing an embodiment of the method of making a window panel with a resin frame according to the present invention.
Figure 11:
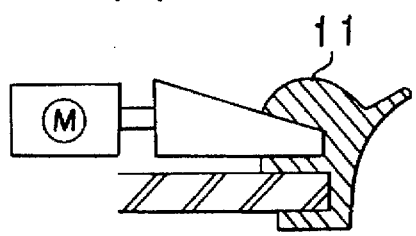
FIG. 11 is a schematic view partly cross-sectioned of the shaped body of resin frame formed with a correction tool in FIG. 10.

FIG. 10 is a diagram showing the construction similar to FIG. 4 except that a correction tool 30 is used instead of the nozzle for blowing compressed air. In this embodiment, the correction tool 30 is disposed near the outlet formed at the front surface portion of the die 10. The correction tool 30 has the top end whose shape substantially corresponds to that of the rain gutter 12. The top end of the correction tool 30 is inserted into the rain gutter 12 of the shaped body 11 by means of a driving source 34 just after the shaped body 11 has been formed. Thus, the shape of the rain gutter 12 can be maintained in a predetermined shape as shown in the cross-sectional view of FIG. 11.

Figure 12:
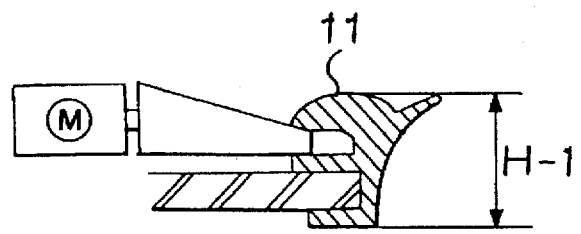
FIG. 12 is a schematic view partly cross-sectioned of the shaped body of resin frame wherein the correction tool is at an intermediate of stroke in FIG. 10.
Figure 13:
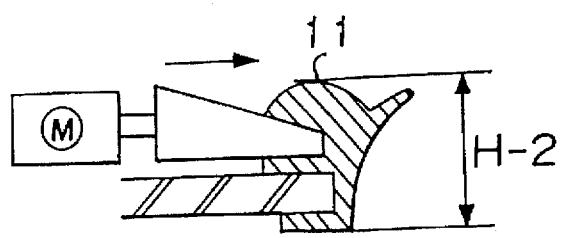
FIG. 13 is a schematic view partly cross-sectioned of the shaped body of resin frame wherein the correction tool is at the deepest portion of stroke in FIG. 10.

Further, the height of the shaped body 11 can be controlled by controlling the advancing movement of the correction tool 30. Namely, when an advancing stroke for the correction tool 30 is small, the height H-1 of the shaped body is small as shown in FIG. 12. On the other hand, when the advancing stroke for the correction tool 30 is large, the height H-2 is large as shown in FIG. 13.

Figure 14:
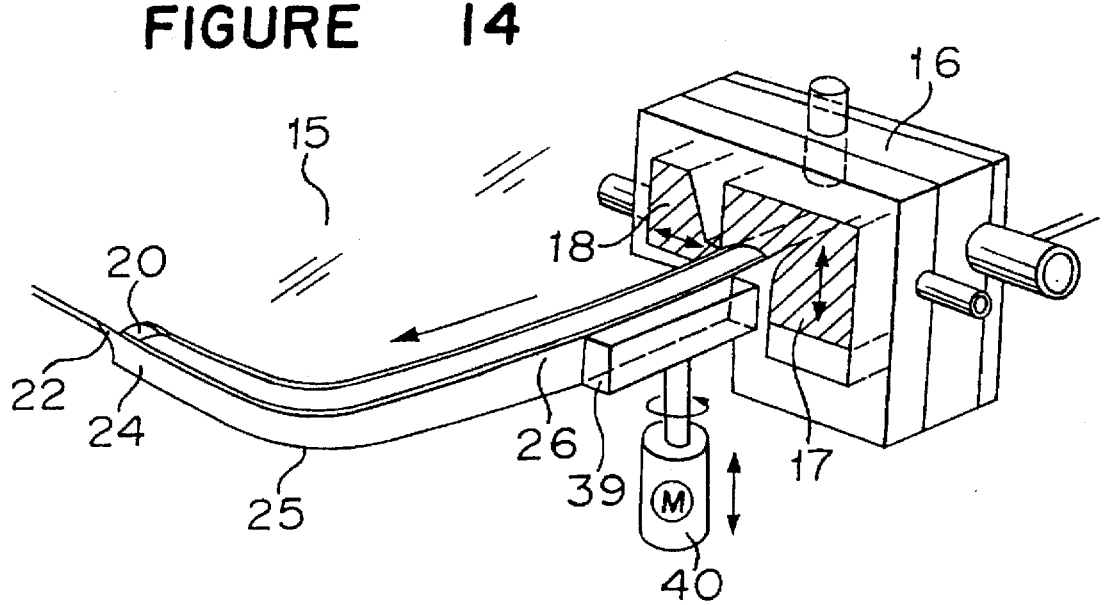
FIG. 14 is a diagram showing an embodiment of the method of making a window panel with a resin frame according to the present invention.
Figure 15:
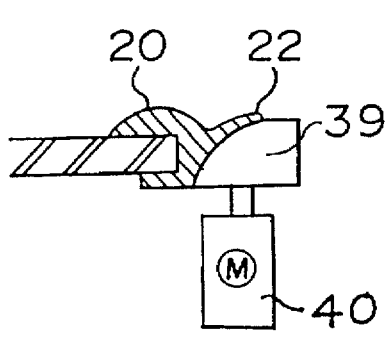
FIG. 15A is a schematic view partly cross-sectioned of a shaped body of resin frame formed at an upper side portion of the plate material in FIG. 14.
FIG. 15B is a schematic view partly cross-sectioned of the shaped body of resin frame formed at a side portion of the plate material in FIG. 14.
Figure 15:
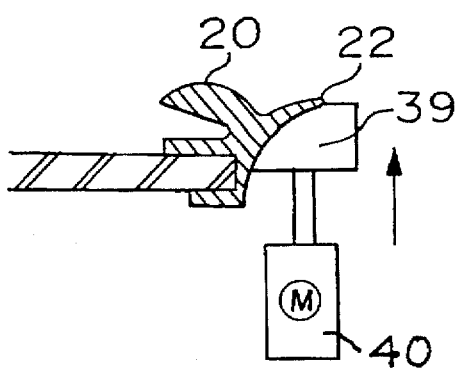

FIG. 14 is a diagram showing an embodiment similar to FIG. 6 except that a correction tool 39 is used instead of the nozzle for blowing compressed air. In this embodiment, chlorinated polyethylene (having a Shore hardness A of 60)

having a high impact resistance and a low friction coefficient is used for the lip portion 22 which contacts with the automobile body, and flexible polyvinyl chloride (having a Shore hardness A of 93) is used for the base portion 20.

In this embodiment, the core members 17 and 18 are disposed in the die 16. The core members 17, 18 are moved at predetermined timings by means of a driving source (not shown) to change the shape of the outlet of the die 16 so that the shape of the frame in cross section is changed when it is extruded. At the same time, an amount of synthetic resin material to be extruded is controlled in correspondence to the shape of the outlet. Generally, the viscosity of the chlorinated polyethylene used for the lip portion 22 is reduced to obtain good outer appearance. Accordingly, the shape of the shaped body after the formation on the glass plate 15 cannot be maintained and tends to cause deformation downwardly. In order to prevent such problem, a correction tool 39 the surface temperature of which is adjusted to 25° C. is applied to the lip portion 22. The correction tool 39 is adapted to be moved vertically by means of a driving source 40 so as not to form a clearance between the correction tool 39 and the lip portion 22 even when the shape of the frame in cross section is changed. Thus, the shape of the lip portion 22 can be maintained accurately.

Figure 16A:
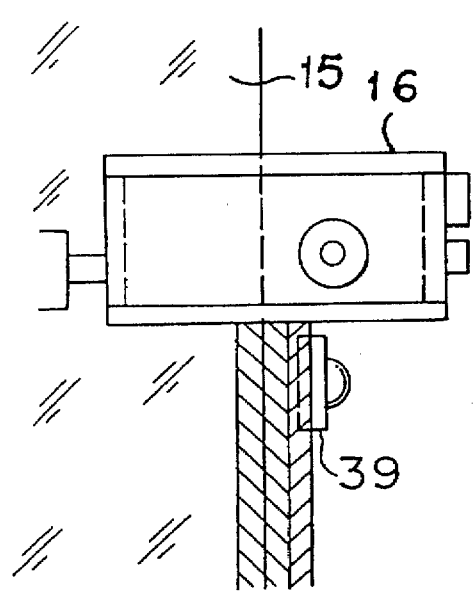
FIG. 16A is a schematic view partly cross-sectioned of the shaped body formed at a linear portion of the plate material in FIG. 14.
Figure 16B:
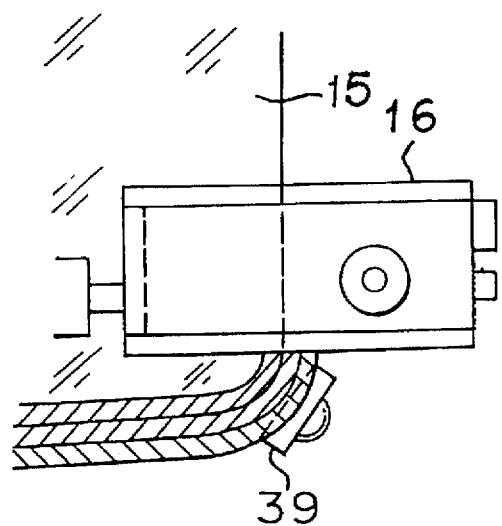
FIG. 16B is a schematic view partly cross-sectioned of the shaped body formed at a corner portion.

FIG. 16 shows the function of the correction tool 39 which is used instead of the nozzle for blowing compressed air in FIG. 8. FIG. 16A is a diagram showing an upper surface of the shaped body formed at a linear portion of the glass plate 15 in which the die 16 and the correction tool 39 are substantially in a parallel relation. On the other hand, when the shaped body is formed at a corner portion 25 of the glass plate 15, the correction tool 39 is turned by a predetermined angle by means of a driving source (FIG. 16B). As a result, the frame whose shape in cross section is gradually changed can be formed throughout the entirety of the peripheral portion of the glass plate 15 while accurate dimensions can be assured.

Figure 17:
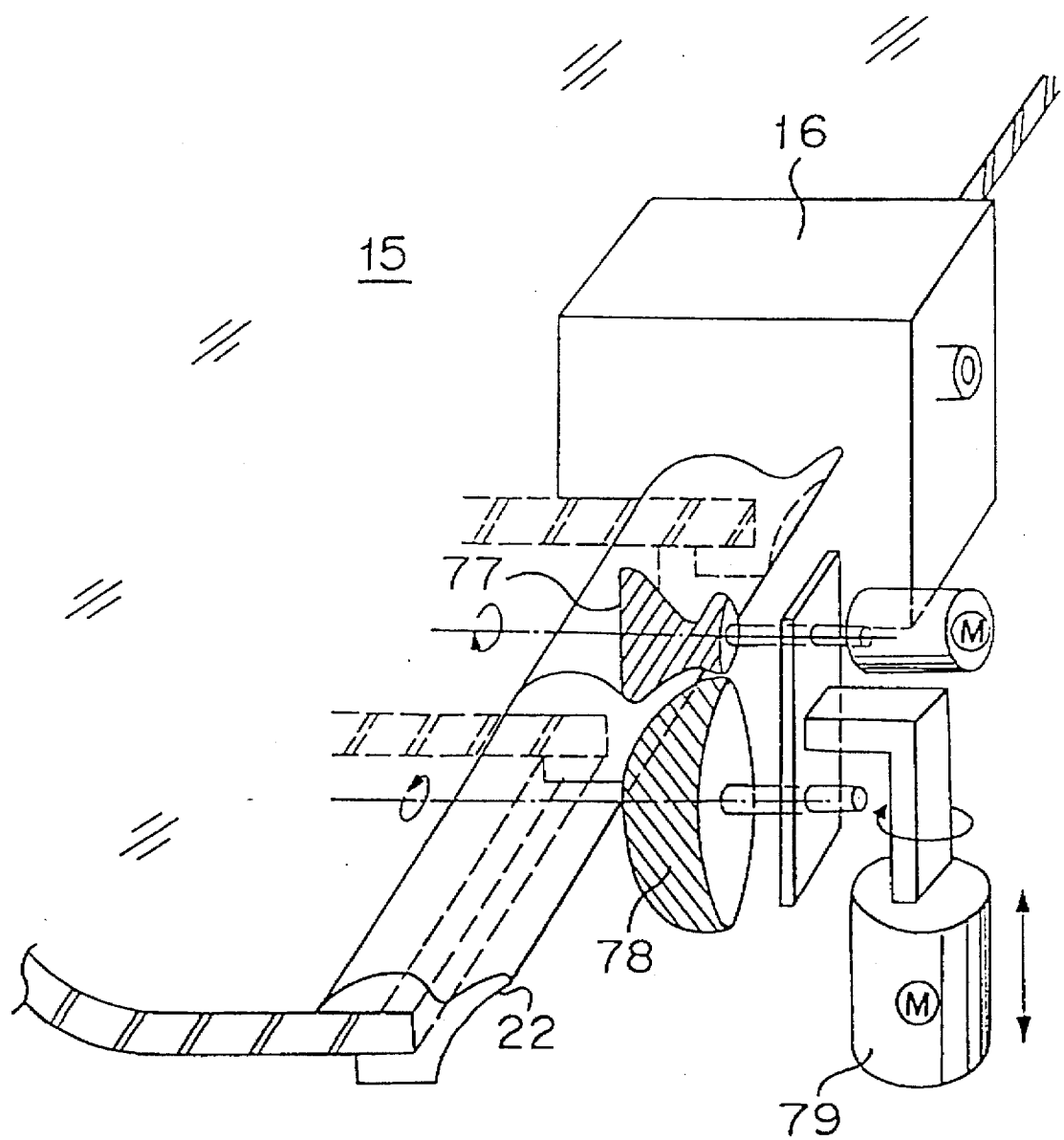
FIG. 17 is a diagram showing an embodiment of the method of making a window panel with a resin frame according to the present invention.

FIG. 17 is a diagram showing another embodiment wherein two rotating members 77, 78 are used as the correction tool. The surface temperature of each of the rotating members 77, 78 is maintained at 25° C., and the lip portion 22 which has just been formed is put between the rotating members 77, 78 to be cooled and solidified. In this case, the rotating members 77, 78 are adapted to be moved vertically by means of a driving source 79 so as not to form a clearance between the rotating members 77, 78 and the lip portion 22 even when the shape of the frame in cross section is changed. Thus, the shape of the lip portion 22 can be maintained accurately.

The plate material used in the present invention may be a single glass plate, a tempered glass or a laminated glass which are subjected to a heat treatment or a chemical treatment, or a plate of organic transparent resin or another material. The frame can be formed integrally with the plate material of any shape such as a flat form or a curved form.

Glass plates for automobile generally have a curved shape wherein the radius of curvature is large at its corner portions, and the corner portions themselves have a large radius of curvature. Accordingly, a shaped body tends to be stretched in the longitudinal direction at the corner portions. A stretching force causes a remarkable deformation of the lip portion or the rain gutter at the corner portion in comparison with the linear portion. Therefore, it is important to blow the compressed air or to apply the correction tool to the shaped body at the corner portion. For instance, the lip portion is sometimes deformed upwardly or downwardly due to the stretching force. Accordingly, it is preferable to arrange jigs which allow compressed air to blow from a upper portion of the lip portion or a correction tool to be applied from the upper portion of the lip portion, in addition to the blowing of the compressed air from the lower portion of the lip portion or to apply the correction tool from the lower portion as described with reference to the above-mentioned embodiments.

Further, the deformation of the shaped body, which has just been formed, can be prevented by quickly solidifying extruded resin before the deformation of the shaped body. When a thermoplastic resin material is used for the frame, it is preferable that the temperature of the compressed air or the temperature of the correction tool be extremely lower than the temperature of the extruded material in order to cool the material quickly.

The synthetic resin material used for the present invention may be a thermoplastic resin which is used in a molten state by heating, such as polyvinyl chloride, copolymer of vinyl chloride and ethylene, a styrene type resin, an olefin type resin or the like. Further, a thermosettable resin suitable for shaping at the normal temperature may be an urethane resin or a silicone resin of moisture-hardening type. Further, a sol-type vinyl chloride wherein a shaped body is formed by extruding into a shape through a die followed by heating, may be used.

In the present invention, gas may be blown to the entire periphery of the shaped body or only a part of it, such as a portion of the shaped body at a corner portion. The condition for blowing depends on materials and shapes of the shaped body. Further, a blowing device for blowing gas may be moved along the plate material, or the plate material may be moved around the blowing device, or they are relatively moved simultaneously or at a suitable timing as far as the blowing device is moved around a part or the entirety of the circumference of the plate material. The frame is formed integrally with the entire periphery or a specific side of the plate material in accordance with requirements of design. Accordingly, the entire periphery of the shaped body does not mean the entire periphery of the plate material, but means that the entire portion of the shaped body which is formed integrally with the plate material. Further, gas may be blown to the entire portion of the shaped body or a local portion (e.g. lip portion, lower surface) of the shaped body.

In the above-mentioned, when different kinds of resin material are used for different portions of the shaped body (e.g. for the lip portion and the base portion), or the length of extension of the lip portion is large, or the dimensions of the rain gutter are large, or the lip portion tends to be deformed downwardly, or the rain gutter tends to be deformed, it is preferable to blow the gas to the entire periphery of the shaped body.

As the gas to be blown, compressed air, nitrogen, carbon monoxide, argon or the like is used. Gas having a positive pressure is blown. However, gas having a negative pressure may be blown (or sucked) to thereby cause a change in a portion of the shaped body.

The temperature of the gas to be blown is preferably the normal temperature or lower than temperature for forming the shaped body. In consideration of accelerating the cooling and solidifying of the shaped body, it is desirable that the temperature be lower than the glass transition temperature of a synthetic resin material used for the shaped body. As described hereinafter, when a thermoplastic resin is used for the shaped body, the temperature of the resin at the extruding time is generally in a range of 160°–180° C. Accordingly, it is sufficient that the temperature of the gas to be blown is the normal temperature.

On the contrary, when the shape of the shaped body is maintained or positively changed by blowing the air just after the formation of the shaped body, the timing of blowing of the air is preferably before the solidification of the shaped body, and the temperature of the shaped body made of a thermoplastic resin is more than the glass transition temperature, more preferably the melting point or more than the minimum temperature capable of extruding. Since a force by blowing the gas can be applied in a non-contact state to a predetermined portion of the shaped body while the shaped body just extruded is still in a softening state, the shape of the shaped body can positively be changed. The blowing of the gas should be conducted before initiation of curing when a thermosettable resin is used, and it should be conducted before the solidification by heating when a sol-type vinyl chloride is used.

Of the above-mentioned kinds of resin, use of the thermoplastic resin is more preferable since the shaped body can be formed into a predetermined shape by blowing the air in a non-contact state before the solidification; the cooling and solidifying of the shaped body can be accelerated, and it is possible to shorten the shape-forming cycle.

The correction tool used in the present invention may be applied to the entire periphery of the shaped body in the same manner as the gas to be blown, or may be applied only to a portion, e.g. a corner portion of the shaped body. Further, the correction tool may be moved along the periphery of the plate material, or the plate material may be moved around the correction tool, or they are simultaneously or alternately moved in a suitable timing as far as the correction tool is relatively moved around the entire periphery or a portion of the plate material.

As material for the correction tool, metal, heat-resisting plastics, rubber, ceramics or the like is used. The temperature of the correction tool should be the normal temperature or lower than the forming temperature of the shaped body. In consideration of accelerating the cooling and solidifying, the temperature should be lower than the glass transition temperature of synthetic resin for the shaped body.

The timing of applying the correction tool to maintain or positively change the shape of the shaped body is preferably before the completion of the solidification of the shaped body and at a temperature of the shaped body which is more than the glass transition temperature when the thermoplastic resin is used, more preferably at the melting point or a temperature more than the minimum temperature capable of extruding. When the thermosettable resin is used, the timing should be before the initiation of curing. When the sol-type vinyl chloride is used, it should be before the solidification by heating.

As described before, the blowing device may be relatively moved around the plate material. In the same manner as this, the correction tool may relatively be moved around the plate material so that the correction tool can move to a predetermined position of the shape body after the shaped body has just been extruded. There is the same relation between the plate material and the die. The die may be moved around the plate material or the plate material may be moved around the die as far as the die is relatively moved around the plate material along its circumferential portion. Further, the die, the gas blowing device and so on can be relatively moved to the circumferential portion of the plate material by moving the die, the plate material, the gas blowing device and so on at a predetermined timing.

In accordance with the present invention, a possibility of the deformation of the frame at the forming time, which may result depending on the shape of and material for the frame to be formed integrally with the plate material for window, can be reduced by blowing air or applying the correction tool.

Further, in accordance with the present invention deformation in the frame in which various kinds of material or shapes are utilized in order to add additional function to the frame, can be prevented, and the flexibility in material and shape for the frame can be increased.

In particular, when the gas is blown to a part of the shaped body at the time of forming integrally the resin frame with the plate material for window, correction of the shape of the shaped body is conducted in a non-contact state, whereby the deformation of the shaped body can be suppressed without forming a mark for pushing in the surface of the shaped body, or the shape of the shaped body can be changed positively.

Further, when a thermoplastic resin is used for the shaped body, gas having a lower temperature than that of the shaped body is used whereby the cooling and solidifying of the shaped body are accelerated and the cycle of forming is shortened.

Obviously, numerous modifications and variations of the present invention are possible in light of the above teachings. It is therefore to be understood that within the scope of the appended claims, the invention may be practiced otherwise than as specifically described herein.

What is claimed is:

1. A method of making a window panel with a resin frame comprising:

forming a shaped body of resin frame by extruding synthetic resin through a die into a specific shape along a peripheral portion of a plate material to be used as a window on at least one surface of the plate material;

blowing gas to at least a part of the shaped body of resin frame in a direction and with a pressure such that the shape of the shaped body is maintained or changed to a desired shape, and solidifying the shaped body to firmly connect the same to the plate material.

2. A method of making a window panel with a resin frame according to claim 1, wherein the gas is blown to the shaped body of resin frame through a blowing means which is located near an outlet of the die for extruding the synthetic resin material.

3. A method of making a window panel with a resin frame according to claim 1, wherein a temperature of the gas to be blown to the shaped body of resin frame is lower than the temperature of the shaped body which has been just shaped.

4. A method of making a window panel with a resin frame according to claim 1, wherein the gas is blown to an extension of the shaped body extruded, which is extended to a side of an outer periphery beyond an edge of the plate material.

5. A method of making a window panel with a resin frame according to claim 4, wherein the gas is blown to the shaped body through a blowing means which is located near an outlet of the die for extruding the synthetic resin material.

6. A method of making a window panel with a resin frame, according to claim 5, wherein a temperature of the gas to be blown to the shaped body of resin frame is lower than a temperature of the shaped body which has just been shaped.

7. A method of making a window panel with a resin frame according to claim 1, wherein the shape of a synthetic resin material extruding portion of the die is continuously changed so that the shape in cross section of the shaped body to be formed at the peripheral portion of the plate material is continuously changed.

8. A method of making a window panel with a resin frame comprising:

forming a shaped body of resin frame by extruding synthetic resin through a die into a specific shape along a peripheral portion of a plate material to be used as a window on at least one surface of the plate material;

applying a correction tool to at least a part of the shaped body of resin frame so that the shape of the shaped body is maintained, and solidifying the shaped body to firmly connect the same to the plate material.

9. A method of making a window panel with a resin frame according to claim 8, wherein the correction tool is applied to an extension of the shaped body extruded, which is extended to a side of an outer periphery beyond an edge of the plate material, whereby the shape of the extension is maintained or changed.

10. A method of making a window panel with a resin frame according to claim 9, wherein the correction tool for maintaining the shape of the extension of the shaped body is located near an outlet of the die for extruding the synthetic resin material.

11. A method of making a window panel with a resin frame comprising:

forming a shaped body of resin frame by extruding synthetic resin through a die into a specific shape along a peripheral portion of a plate material to be used as a window on at least one surface of the plate material;

applying a correction tool to at least a part of the shaped body of resin frame so that the shape of the shaped body is maintained or changed, and solidifying the shaped body to firmly connect the same to the plate material, wherein the correction tool is applied to an extension of the shaped body extruded, said extension being extended to a side of a outer periphery beyond an edge of the plate material, whereby the shape of the extension is maintained or changed, and wherein a temperature of the correction tool is lower than a temperature of the shaped body which has just been shaped.

12. A method of making a window panel with a resin frame according to claim 8, wherein the correction tool for maintaining the shape of the shaped body is located near an outlet of the die for extruding the synthetic resin material.

13. A method of making a window panel with a resin frame comprising:

forming a shaped body of resin frame by extruding synthetic resin through a die into a specific shape along a peripheral portion of a plate material to be used as a window on at least one surface of the plate material;

applying a correction tool to at least a part of the shaped body of resin frame so that the shape of the shaped body is maintained or changed, and solidifying the shaped body to firmly connect the same to the plate material, wherein A temperature of the correction tool is lower than A temperature of the shaped body which has just been shaped.

14. A method of making a window panel with a resin frame comprising:

forming a shaped body of resin frame by extruding thermoplastic resin which is in a molten state by heating through a die into a specific shape along a peripheral portion of a plate material to be used as a window on at least one surface of the plate material;

blowing gas to at least a part of the shaped body of resin frame in a direction and with a pressure such that the shape of the shaped body is maintained or changed to a desired shape, and solidifying the shaped body to firmly connect the same to the plate material.

15. A method of making a window panel with a resin frame according to claim 14, wherein the gas is blown to the shaped body of resin frame through a blowing means which is located near an outlet of the die for extruding the synthetic resin material.

16. A method of making a window panel with a resin frame according to claim 14, wherein A temperature of the gas to be blown to the shaped body of resin frame is lower than the temperature of the shaped body which has been just shaped.

17. A method of making a window panel with a resin frame according to claim 14, wherein the gas is blown to an extension of the shaped body extruded, which is extended to a side of an outer periphery beyond an edge of the plate material.

18. A method of making a window panel with a resin frame according to claim 17, wherein the gas is blown to the shaped body through a blowing means which is located near an outlet of the die for extruding the synthetic resin material.

19. A method of making a window panel with a resin frame according to claim 17, wherein A temperature of the gas to be blown to the shaped body of resin frame is lower than the temperature of the shaped body which has just been shaped.

20. A method of making a window panel with a resin frame according to claim 14, wherein the shape of a synthetic resin material extruding portion of the die is continuously changed so that the shape in cross section of the shaped body to be formed at the peripheral portion of the plate material is continuously changed.

* * * * *